US009159151B2

(12) United States Patent
Perez et al.

(10) Patent No.: US 9,159,151 B2
(45) Date of Patent: Oct. 13, 2015

(54) BRINGING A VISUAL REPRESENTATION TO LIFE VIA LEARNED INPUT FROM THE USER

(75) Inventors: Kathryn Stone Perez, Kirkland, WA (US); Alex Kipman, Redmond, WA (US); Nicholas D. Burton, Hermington (GB); Andrew Wilson, Ashby de la Zouch (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 486 days.

(21) Appl. No.: 12/501,964

(22) Filed: Jul. 13, 2009

(65) Prior Publication Data
US 2011/0007079 A1 Jan. 13, 2011

(51) Int. Cl.
*G06T 13/40* (2011.01)
*G06F 3/01* (2006.01)
*A63F 13/213* (2014.01)
*A63F 13/58* (2014.01)
(Continued)

(52) U.S. Cl.
CPC .................. *G06T 13/40* (2013.01); *A63F 13/56* (2014.09); *A63F 13/67* (2014.09); *G06F 3/011* (2013.01); *G06F 3/017* (2013.01); *H04N 21/4223* (2013.01); *H04N 21/44218* (2013.01); *H04N 21/4532* (2013.01); *H04N 21/4667* (2013.01); *H04N 21/4781* (2013.01); *A63F 13/213* (2014.09); *A63F 13/58* (2014.09); *G01S 17/36* (2013.01); *G01S 17/89* (2013.01)

(58) Field of Classification Search
CPC ............ G06T 13/40; A63F 2300/5546; A63F 2300/5553; G06F 3/011; G06F 2203/011
USPC .................................... 345/473; 715/706–707
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 201254344 B 6/2010
EP 0583061 A2 2/1994
(Continued)

OTHER PUBLICATIONS

Smith et al., The Social Life of Small Graphical Chat Spaces, Apr. 6, 2000, CHI '2000 The Hague, Amsterdam, pp. 462-469.*
(Continued)

*Primary Examiner* — Xiao Wu
*Assistant Examiner* — Matthew D Salvucci
(74) *Attorney, Agent, or Firm* — Judy Yee; Micky Minhas

(57) ABSTRACT

Data captured with respect to a human may be analyzed and applied to a visual representation of a user such that the visual representation begins to reflect the behavioral characteristics of the user. For example, a system may have a capture device that captures data about the user in the physical space. The system may identify the user's characteristics, tendencies, voice patterns, behaviors, gestures, etc. Over time, the system may learn a user's tendencies and intelligently apply animations to the user's avatar such that the avatar behaves and responds in accordance with the identified behaviors of the user. The animations applied to the avatar may be animations selected from a library of pre-packaged animations, or the animations may be entered and recorded by the user into the avatar's avatar library.

18 Claims, 11 Drawing Sheets

(51) Int. Cl.

| | | |
|---|---|---|
| H04N 21/466 | (2011.01) | |
| H04N 21/4223 | (2011.01) | |
| H04N 21/442 | (2011.01) | |
| H04N 21/45 | (2011.01) | |
| H04N 21/478 | (2011.01) | |
| A63F 13/67 | (2014.01) | |
| A63F 13/56 | (2014.01) | |
| G01S 17/36 | (2006.01) | |
| G01S 17/89 | (2006.01) | |

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,183,364 B1 * | 2/2001 | Trovato ........................... 463/32 |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,545,682 B1 | 4/2003 | Ventrella et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,090,576 B2 | 8/2006 | Herbrich et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |

(56) References Cited

U.S. PATENT DOCUMENTS

| | | | |
|---|---|---|---|
| 7,317,836 B2 | 1/2008 | Fujimura et al. |
| 7,319,992 B2 | 1/2008 | Gaos |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,478,047 B2 | 1/2009 | Loyall |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2004/0207597 A1 | 10/2004 | Marks |
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0091692 A1 | 4/2008 | Keith |
| 2008/0100620 A1 | 5/2008 | Nagai et al. |
| 2008/0124690 A1 | 5/2008 | Redlich |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0215972 A1 | 9/2008 | Zalewski et al. |
| 2008/0215973 A1 | 9/2008 | Zalewski et al. |
| 2008/0215975 A1 | 9/2008 | Harrison |
| 2008/0225041 A1 | 9/2008 | El Dokor |
| 2008/0231686 A1 | 9/2008 | Redlich |
| 2009/0044113 A1* | 2/2009 | Jones et al. ............ 715/707 |
| 2009/0141933 A1 | 6/2009 | Wagg |
| 2009/0167679 A1 | 7/2009 | Klier |
| 2009/0221368 A1* | 9/2009 | Yen et al. ............ 463/32 |

FOREIGN PATENT DOCUMENTS

| | | |
|---|---|---|
| JP | 08044490 A1 | 2/1996 |
| JP | 2001-229398 A | 8/2001 |
| RU | 2006110940 A | 8/2006 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 00/04478 | 1/2000 |
| WO | WO 01/59975 A3 | 8/2001 |
| WO | WO 02/082249 A2 | 10/2002 |
| WO | WO 03/001722 A3 | 1/2003 |
| WO | WO 03/046706 A1 | 6/2003 |
| WO | WO 03/054683 A3 | 7/2003 |
| WO | WO 03/071410 A3 | 8/2003 |
| WO | WO 03/073359 A3 | 9/2003 |
| WO | WO 2008/115234 A1 | 9/2008 |
| WO | WO 2009/059065 A1 | 5/2009 |

OTHER PUBLICATIONS

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Freeman, W., "Softkinetic Unveils New Gesture Recognition Technology", Mar. 25, 2009, Intent Media 2009, http://www.developmag.com, 2 pages.

Uchino, S. et al., "VR Interaction in Real-Time Between Avatar with Voice and Gesture Recognition System", 21st International Conference on Advanced Information Networking and Applications Workshops, (AINAW), 2007, 6 pages.

VR/MR (Virtual Reality/Mixed Reality), http://mind.kaist.ac.kr, Downloaded from Internet Apr. 6, 2009, 4 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

(56) References Cited

OTHER PUBLICATIONS

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Yuasa et al.; A Method of Generating Facial Expressions for Negotiation Agents by Using Bayesian Network; Journal of Information Processing; vol. 44, No. 11; Information Processing Society of Japan; Nov. 2003; p. 1-9.

Masa et al.; "The Agent Moving Autonomously in the Virtual Space—3D Actor Object"; The Technical Report of the Institution of Image Information and Televisions Engineers; vol. 23 No. 51; Aug. 1999; p. 1-6.

\* cited by examiner

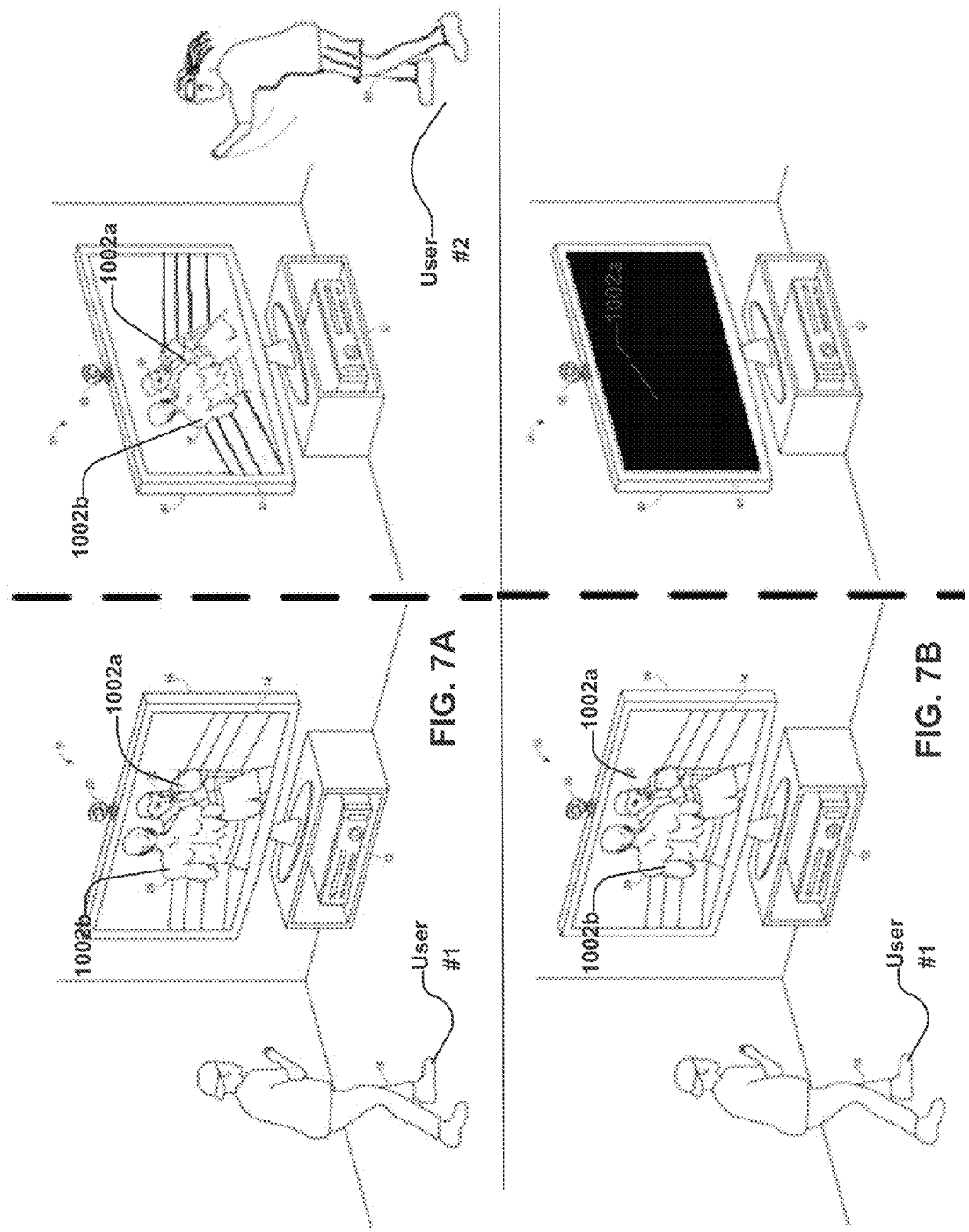

BRINGING A VISUAL REPRESENTATION TO LIFE VIA LEARNED INPUT FROM THE USER

BACKGROUND

Various applications will display a visual representation that corresponds to a user that the user can control through certain actions, such as selecting buttons on a remote or moving a controller in a certain manner. The visual representation is a computer representation that typically takes the form of a two-dimensional (2D) or three-dimensional (3D) model and is rendered in various applications, such as computer games, video games, chats, forums, communities, instant messaging services, and the like. The visual representation may be in the form of an avatar, a fanciful character, a cartoon image or animal, a cursor, a hand, or the like. Many computing applications such as computer games, multimedia applications, office applications, or the like provide a selection of predefined animated characters that may be selected for use in the application as the user's avatar. Typically, the animations performed by an avatar are selected from a library of animations. Users can choose for their avatars to perform specific animations from that library by pressing buttons or keys on a remote, for example.

SUMMARY

Disclosed herein are techniques for intelligently training an avatar to perform animations via learning the inputs from a user. Over time, the avatar in the virtual space may appear to become a reflection of the user in the physical space, including reflecting aspects of the user's features, behaviors, tendencies, voice patterns, etc. For example, a system may have a capture device that captures data about the user in the physical space. The system may identify the user's characteristics, tendencies, voice patterns, behaviors, gestures, etc. Over time, the system may learn a user's tendencies and intelligently apply animations to the user's avatar such that the avatar behaves and responds in accordance with the identified behaviors of the user. Thus, training an avatar the animations to perform may comprise learning the inputs from a user and molding the avatar to resemble the user.

The system may therefore render an avatar that resembles the user, whether or not the user is present in the physical space. In an example embodiment, the animations applied to the avatar may be animations selected from a library of pre-packaged animations, such as those that come with a program, application, or a system, for example. The animations selected may be those which correspond to the user's inputs learned by the system. In another example embodiment, the animations in the library may be animations entered and recorded by the user into the avatar's animation vocabulary. For example, the system or the user may reprogram an animation to reflect the user's actual motions or behaviors, captured by a capture device for example. Thus, animations may be added to or overwritten in the library of avatar animations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for modifying a visual representation in accordance with this specification are further described with reference to the accompanying drawings in which:

FIG. 7A depicts two users interacting with each other remotely via their respective target, recognition, and tracking systems. FIG. 7B depicts a first user interacting with a second user's avatar where the second user is absent from the scene.

DETAILED DESCRIPTION OF ILLUSTRATIVE EMBODIMENTS

Figure 1:
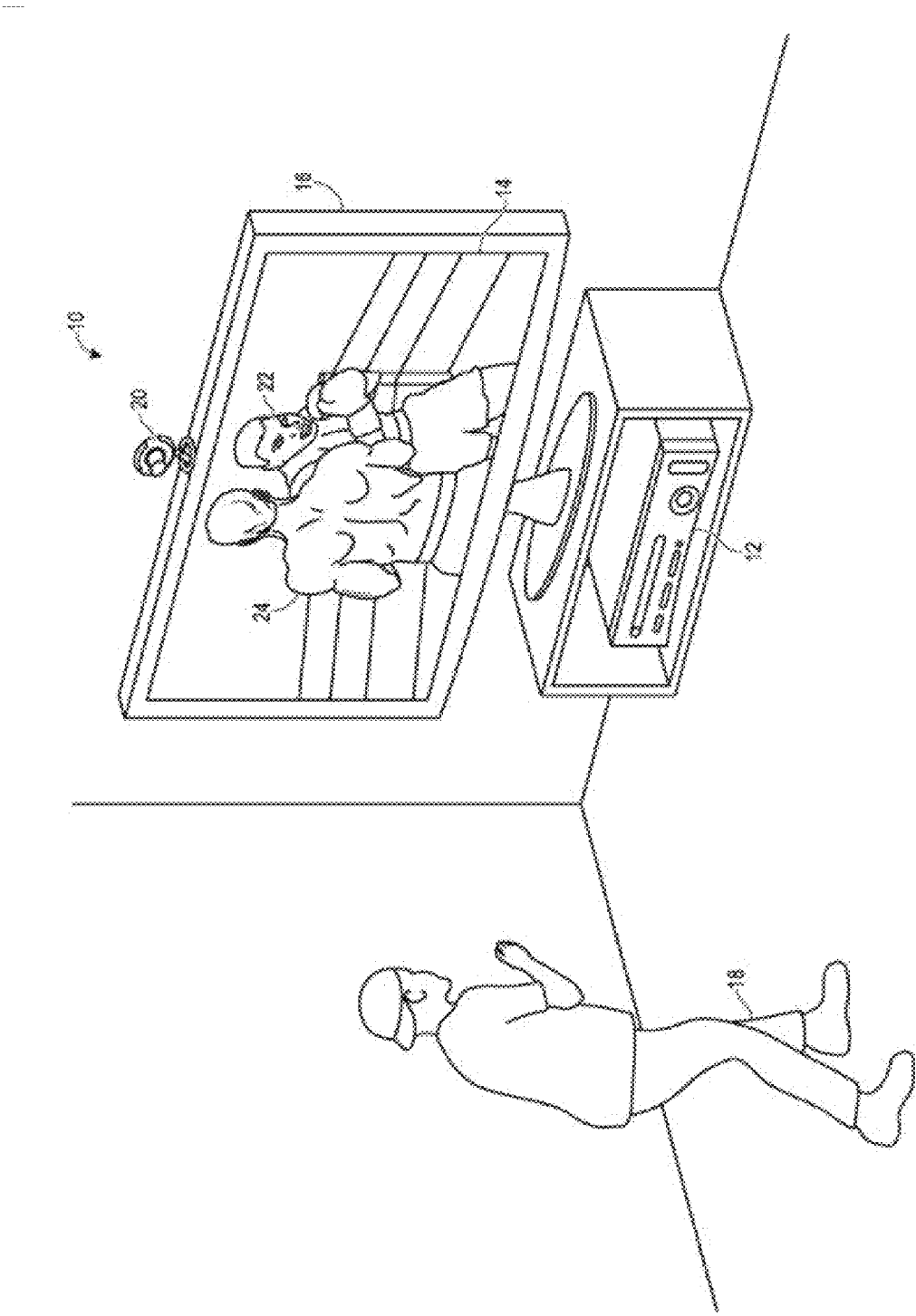
FIG. 1 illustrates an example embodiment of a target recognition, analysis, and tracking system with a user playing a game.

Disclosed herein are techniques for rendering a visual representation of a user, such as an avatar, that behaves in accordance with a user. For example, systems and methods are disclosed that comprise intelligently training an avatar to perform animations by learning a user's tendencies through user inputs. The visual representation of the user may be in the form of an avatar, a cursor on the screen, a hand, or the any other virtual object that corresponds to the user in the physical space. A computing system can model and display a visual representation of the user by capturing data from a physical space. For example, the system may comprise a capture device that captures image data of a scene and a monitor that displays a visual representation that corresponds to a user in the scene. It may be desirable to initialize and/or customize a visual representation based on physical characteristics of the user. For example, the capture device may identify physical features of a user and customize the user's avatar based on those identified features, such as eye shape, nose shape, clothing, accessories.

To generate a model representative of a the user in the physical space, the capture device can capture a depth image of the scene and scan targets or objects in the scene. In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The model of the user, such as a skeletal or mesh model, may represent the user's body type, bone structure, height, weight, or the like. The model may then be provided to the computing environment for tracking the model and rendering an avatar associated with the model.

The system may track the user and any motion in the physical space and identify characteristics of the user that can be applied to the user's visual representation. The identified characteristics may be indicative of the user's behaviors. For example, the system may identify the user's physical characteristics, tendencies, voice patterns, gestures, etc. The system may continue to track the user over time and apply modifications or updates to the user's avatar based on the history of the tracked data. For example, the capture device may continue to identify behaviors and mannerisms, emotions, speech patterns, or the like, of a user and apply these to the user's avatar. The fidelity of the rendered avatar, with respect to the resemblance of the avatar to the avatar, increases over time as the system gathers history data for that user.

The system, methods, and components of avatar creation and customization described herein may be embodied in a multi-media console, such as a gaming console, or in any other computing device in which it is desired to display a visual representation of a target, including, by way of example and without any intended limitation, satellite receivers, set top boxes, arcade games, personal computers (PCs), portable telephones, personal digital assistants (PDAs), and other hand-held devices.

FIGS. 1A and 1B illustrate an example embodiment of a configuration of a target recognition, analysis, and tracking system 10 that may employ techniques tracking a history of user inputs to generate an avatar that resembles the user. In the example embodiment, a user 18 playing a boxing game. In an example embodiment, the system 10 may recognize, analyze, and/or track a human target such as the user 18. The system 10 may gather information related to the user's gestures in the physical space, as well as the user's physical features and behavioral characteristics.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIG. 1, the target recognition, analysis, and tracking system 10 may be used to recognize, analyze, and/or track a human target such as the user 18. The motion of the visual representation can be controlled by mapping the movement of the visual representation to the motion of the user in the physical space. Motion in the physical space may be a gesture that corresponds to a control in a system or application space, such as a virtual space and/or a game space. For example, the user 18 may be tracked using the capture device 20 such that the movements of user 18 may be interpreted as controls that may be used to affect the application being executed by computer environment 12. The computing environment may determine which controls to perform in an application executing on the computer environment based on, for example, the user's gesture, recognized and mapped to the model of the user. Thus, the user can control the avatar's motion by making gestures in the physical space.

Captured motion may be any motion in the physical space that is captured by the capture device, such as a camera. The captured motion could include the motion of a target in the physical space, such as a user or an object. The captured motion may include a gesture that translates to a control in an operating system or application. The motion may be dynamic, such as a running motion, or the motion may be static, such as a user that is posed with little or no motion.

The system 10 may translate an input to a capture device 20 into an animation, the input being representative of a user's motion, such that the animation is driven by that input. Thus, the user's motions may map to an avatar 40 such that the user's motions in the physical space are performed by the avatar 40. The user's motions may be gestures that are applicable to a control in an application. As shown in FIGS. 1A and 1B, in an example embodiment, the application executing on the computing environment 12 may be a boxing game that the user 18 may be playing.

The capture device 20 may capture data representative of a user's behaviors. For example, the capture device may capture characteristics that are indicative of the user's behaviors. Such characteristics may include the user's body position, facial expressions, vocal commands, speech patterns, gestures, or the like. The computing environment 12 may analyze the captured data and correlate a user's behaviors with contextual circumstances, such as conditions of the user's environment, the status of the system or application, the success/result of the user in the application, the active or non-active status of the user, or any other detectable circumstance. Thus, the system may learn the user's behavioral tendencies, such as how the user responds to various situations.

The computing environment 12 may use the audiovisual device 16 to provide a visual representation of a player avatar 40 that the user 18 may control with his or her movements. The player avatar 40 may have the characteristics of the user identified by the capture device 20, or the system 10 may use the features of a well-known boxer or portray the physique of a professional boxer for the visual representation that maps to the user's motions. According to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space. For example, as shown in FIG. 1B, the user 18 may throw a punch in physical space to cause the player avatar 40 to throw a punch in game space. The computing environment 12 may also use the audiovisual device 16 to provide a visual representation of a boxing opponent 38 to the user 18.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

Multiple users can interact with each other from remote locations. For example, the visual representation of the boxing opponent 38 may be representative of another user, such as a second user in the physical space with user 18 or a networked user in a second physical space. Alternately, the system may render an avatar associated with a user whether or not the user is present in the physical space or interacting with the system/application. For example, a first user's avatar may be interacting with a second user's avatar. The first user may be present in the physical space, controlling the gestures and movements of the first user's avatar. However, the second user associated with the second user's avatar may not be present in the physical space. Using the history of inputs by the second user, the system may intelligently apply animations to the second user's avatar such that the avatar resembles the behaviors learned from the second user's inputs. The second user's avatar may resemble the second user, closely reflecting the second user's tendencies, habits, and other characteristics applicable to the application. The first user can therefore have an experience in the virtual world with the second user's avatar that may be similar to the instance where the second user is physically present and controlling the second user's avatar.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. A user's gestures or motion may be interpreted as controls that may correspond to actions other than controlling the player avatar 40. For example, the player may use movements to end, pause, or save a game, select a level, view high scores, communicate with a friend, etc. Virtually any controllable aspect of an operating system and/or application may be controlled by movements of the target such as the user 18.

According to other example embodiments, the target recognition, analysis, and tracking system 10 may interpret target movements for controlling aspects of an operating system and/or application that are outside the realm of games. The user's gesture may be controls applicable to an operating system, non-gaming aspects of a game, or a non-gaming application. The user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab. Similarly, the system may learn the user's behaviors from the user's inputs throughout the execution of any type of application. The system may animate the user's avatar to behave in accordance with the learned inputs in that application or any other application.

Figure 2:
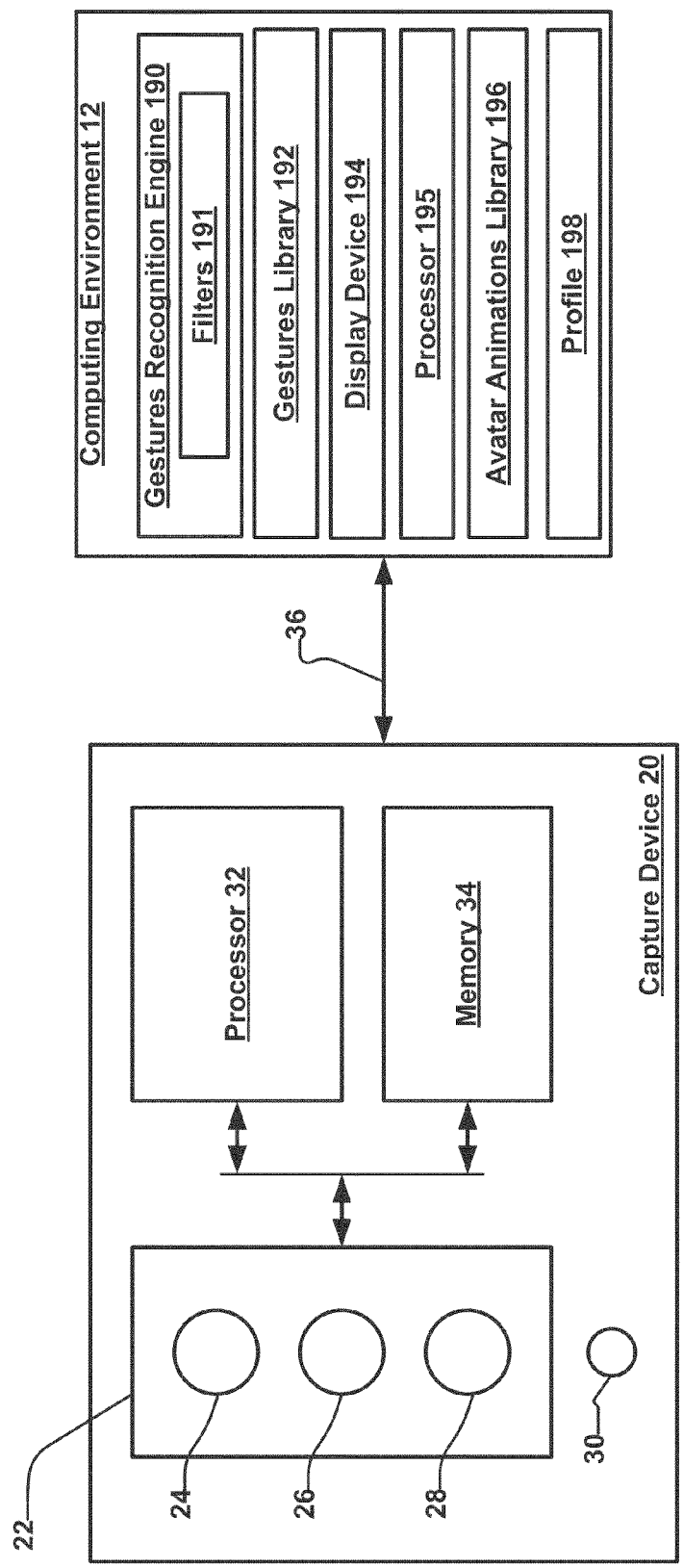
FIG. 2 illustrates an example embodiment of a capture device that may be used in a target recognition, analysis, and tracking system and incorporate chaining and animation blending techniques.

FIG. 2 illustrates an example embodiment of a capture device 20 that may be used for target recognition, analysis, and tracking, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 192.

As shown, in FIG. 2, the computing environment 12 may include a gestures library 192 and a gestures recognition engine 190. The gestures recognition engine 190 may include a collection of gesture filters 191. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

The data captured by the cameras 26, 28 and device 20 in the form of the skeletal model and movements associated with it may be compared to the gesture filters 191 in the gesture library 190 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 12 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20 itself, and the raw image data of depth and color (where the capture device 20 comprises a 3D camera 26) values are transmitted to the computing environment 12 via link 36. In another embodiment, the processing is performed by a processor 32 coupled to the camera 402 and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

The computing environment 12 may use the gestures library 192 to interpret movements of the skeletal model and to control an application based on the movements. The computing environment 12 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted to control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store profile information 198 about the target in a computing environment such as computing environment 12. The profile information 198 may be in the form of user profiles, personal profiles, application profiles, system profiles, or any other suitable method for storing data for later access. The profile information 198 may be accessible via an application or be available system-wide, for example. The profile information 198 may include lookup tables for loading specific user profile information. The virtual screen may interact with an application that may be executed by the computing environment 12 described above with respect to FIG. 1.

According to example embodiments, lookup tables may include user specific profile information. In one embodiment, the computing environment such as computing environment 12 may include stored profile data 198 about one or more users in lookup tables. The stored profile data 198 may include, among other things the targets scanned or estimated body size, skeletal models, body models, voice samples or passwords, the targets age, previous gestures, target limitations and standard usage by the target of the system, such as, for example a tendency to sit, left or right handedness, or a tendency to stand very near the capture device. This information may be used to determine if there is a match between a target in a capture scene and one or more user profiles 198, that, in one embodiment, may allow the system to adapt the virtual screen to the user, or to adapt other elements of the computing or gaming experience according to the profile 198.

One or more personal profiles 198 may be stored in computer environment 12 and used in a number of user sessions, or one or more personal profiles may be created for a single session only. Users may have the option of establishing a profile where they may provide information to the system such as a voice or body scan, age, personal preferences, right or left handedness, an avatar, a name or the like. Personal profiles may also be provided for "guests" who do not provide any information to the system beyond stepping into the capture space. A temporary personal profile may be established for one or more guests. At the end of a guest session, the guest personal profile may be stored or deleted.

As shown, in FIG. 2, the computing environment 12 may include an avatar library 196 that comprises animations selectable for application to the user's avatar. The user profile 198 may include an avatar library or otherwise associated with an avatar library with animations specific to the user. The lookup tables may include the user's behaviors and tendencies with respect to various contextual circumstances. The profile may be use to apply animations to the user's avatar so that the avatar closely reflects the behaviors of the user.

The animations in the avatar library may comprise any characteristic that may be applied to an avatar. The characteristics may be indicative of a user's behavior. Thus, the animation selected for application to the user's behavior may be selected to correspond to the user's behaviors. The animations may include any one of or any combination of voice or speech patterns, vocabulary, noise volumes, words, physical characteristics, movements, or the like. The animations may comprise motion that may be dynamic, such as a running motion, or the motion may be static, such as a pose with little or no motion. The avatar library may be associated to a particular user or stored in a user profile, for example.

The animations in the avatar library 193 may be a stock library of animations. In an example embodiment, the animations applied to the avatar may be animated with an animations selected from a library of pre-packaged animations, such as those that come with a program, application, or a system, for example. The animation selected for application to the user's avatar may be that which correspond to the user's inputs learned by the system to reflect certain behaviors. For example, the system may identify that the user tends to jump up and down in a certain context, such as when achieving success in a game application. Thus, when the system identifies a similar set of contextual circumstances such as a similar state of the game (e.g., success), the system may select an animation that reflects jumping up and down and apply the animation to the user's avatar. The pre-canned animations may be defined for an application or for a system. For example, the jumping up and down animation may be applicable to a gaming application, but an open/close file animation applied to an avatar may be the same system-wide.

The animations in the avatar library may be animations entered and recorded by the system or the user. The system allows users to overwrite or add to the stock library of animations. For example, the system or the user may overwrite a stock animation to reflect the user's actual motions or behaviors, captured by a capture device for example. Thus, animations may be added to or overwritten in the library of avatar animations so the animations applied are tailored to the data captured with respect to a particular user. In the example of the jumping up and down animation, the system may rewrite the standard or default animation for jumping up and down by recording the user's actual motion. Thus, the jumping up and down animation may applied to the user's avatar is tailored to the user's actual motions.

The system may also store data related to the user's inputs in an avatar library. The avatar library may comprise indications of a user's behaviors and/or the circumstances that correspond to the behaviors. For example, the circumstances may be contextual circumstances that indicate a context that correlates to the user's behaviors. The contextual circumstances may include any identifiable features of the scenario that may or may not correlate to the user's behavior. The system can track the contextual circumstances with respect to the user's behaviors and identify correlations between the contextual circumstances and the tendencies in the user's behaviors.

Contextual circumstances, for example, may include conditions of the user's environment, including the user's physical or virtual environment, other users present in the physical space, the state of the game, the results in the application, the active or non-active status of the user, or the like. Conditions of the user's environment may comprise the physical features of the scene as captured by the capture device, such as the colors of the walls, the furniture in the room, lighting, etc. The conditions of the user's environment may comprise the virtual conditions of the environment, such as animations on the screen (e.g., virtual mountains displayed in a skiing game application). The state of the application may include any status of the application, such as if the application is paused, the amount of time an application has been executing, the skill level required (such as in a game application), or the like. The results in the application may be, for example, if code runs through a debugger successfully, or a player in a game application achieves success or failure in the game.

The gestures library and filter parameters may be tuned for an application or a context of an application by a gesture tool. The system may identify and store the contexts of the application and correlate these to the inputs by the user. Using the contextual information, the system can correlate certain behaviors of the user with a context. In this manner, the system intelligently can apply animations to an avatar such that the avatar responds to contextual circumstances with similar behavior.

A context may have identifiable circumstances of the context (i.e., contextual circumstances) and may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts, or contextual circumstances, among different environments of a single application. Take a first-user shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. With respect to modifications to the visual representation, different gestures may trigger different modifications depending on the environment. A different modification trigger gesture could be used for entry into an application-specific modification mode versus a system-wide modification mode. Each modification mode may be packaged with an independent set of gestures that correspond to the modification mode, entered into as a result of the modification trigger gesture. For example, in a bowling game, a swinging arm motion may be a gesture identified as swinging a bowling ball for release down a virtual bowling alley. However, in another application, the swinging arm motion may be a gesture identified as a request to lengthen the arm of the user's avatar displayed on the screen. There may also be one or more menu environments, where the user can save his game, select among his character's equipment or perform similar actions that do not comprise direct game-play. In that environment, this same gesture may have a third meaning, such as to select something or to advance to another screen.

The avatar libraries, including an avatar library that corresponds to a particular user or an avatar library that is pre-packed with an application, may be accessible for an application, across applications, or system-wide. For example, the system may identify the user's behaviors throughout various applications. The system may collect all of the data related to the user's behaviors across applications and store them in a universally-acceptable avatar library. The system may then access the avatar library and apply animations from the avatar library to the avatar under any circumstance.

A gesture may be recognized as a request for modifying animations in an avatar library. A plurality of gestures may each represent a request to modify a particular animation. The system can prompt the user to perform the desired motion for the particular animation, Thus, a user can actively modify an avatar library that may be associated with the user by making a gesture in the physical space that is recognized as a modification gesture. For example, as described above, the user's motion may be compared to a gesture filter, such as gesture filter 191 from FIG. 2. The gesture filter 191 may comprise information for a modification gesture from the modifications gestures 196 in the gestures library 192.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

The gestures library 192, gestures recognition engine 190, avatar library 196, and profile 198 may be implemented in hardware, software or a combination of both. For example, the gestures library 192, and gestures recognition engine 190 may be implemented as software that executes on a processor, such as processor 195, of the computing environment 12 (or on processing unit 101 of FIG. 3 or processing unit 259 of FIG. 4).

It is emphasized that the block diagram depicted in FIG. 2 and FIGS. 3-4 described below are exemplary and not intended to imply a specific implementation. Thus, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 190 may be implemented as software that executes on the processor 32 of the capture device or it may be implemented as software that executes on the processor 195 in the computing environment 12. Any combination of processors that are suitable for performing the techniques disclosed herein are contemplated. Multiple processors can communicate wirelessly, via hard wire, or a combination thereof.

Furthermore, as used herein, a computing environment 12 may refer to a single computing device or to a computing system. The computing environment may include non-computing components. The computing environment may include a display device, such as display device 193 shown in FIG. 2. A display device may be an entity separate but coupled to the computing environment or the display device may be the computing device that processes and displays, for example. Thus, a computing system, computing device, computing environment, computer, processor, or other computing component may be used interchangeably.

Figure 3:
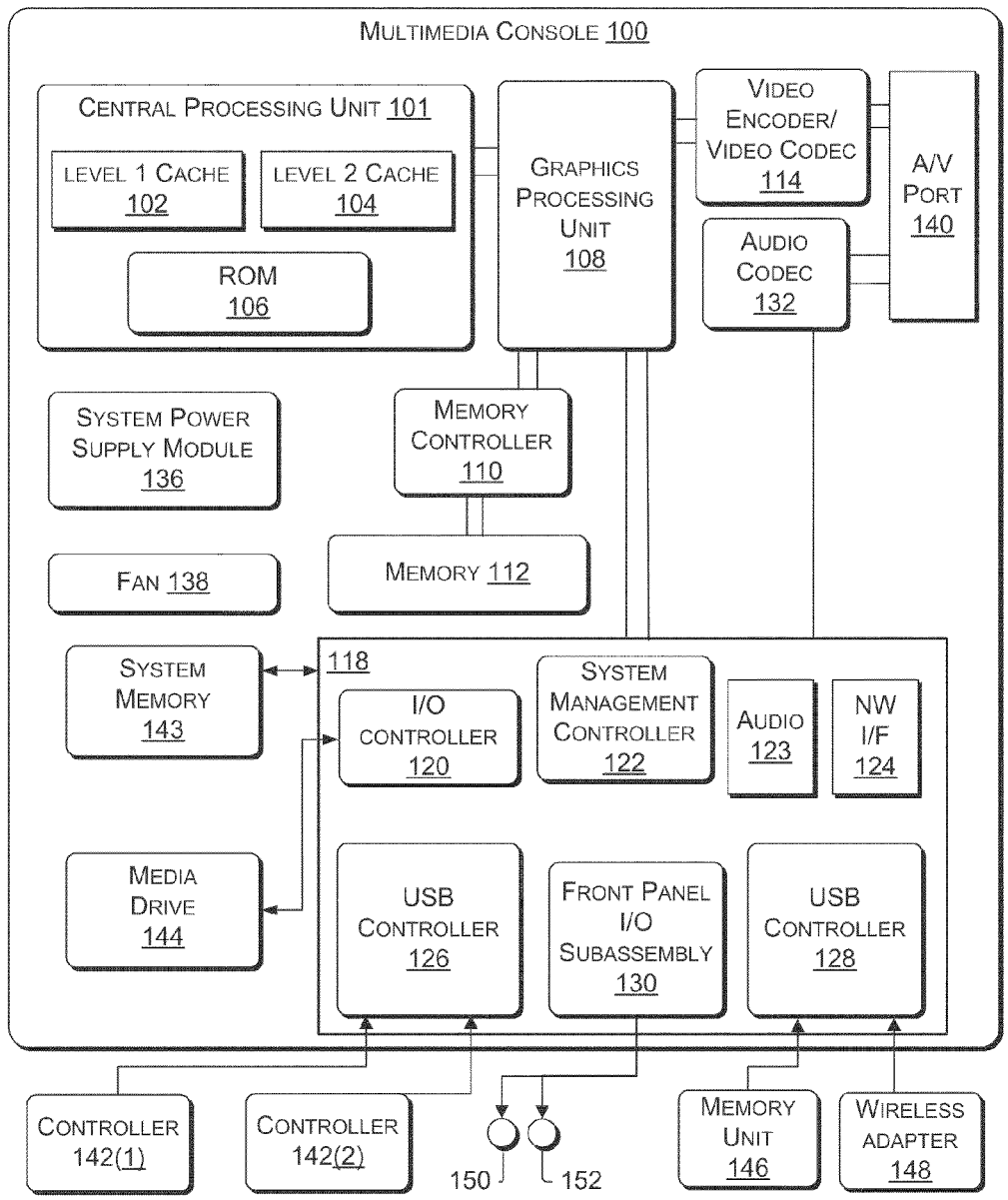
FIG. 3 illustrates an example embodiment of a computing environment in which the animation techniques described herein may be embodied.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
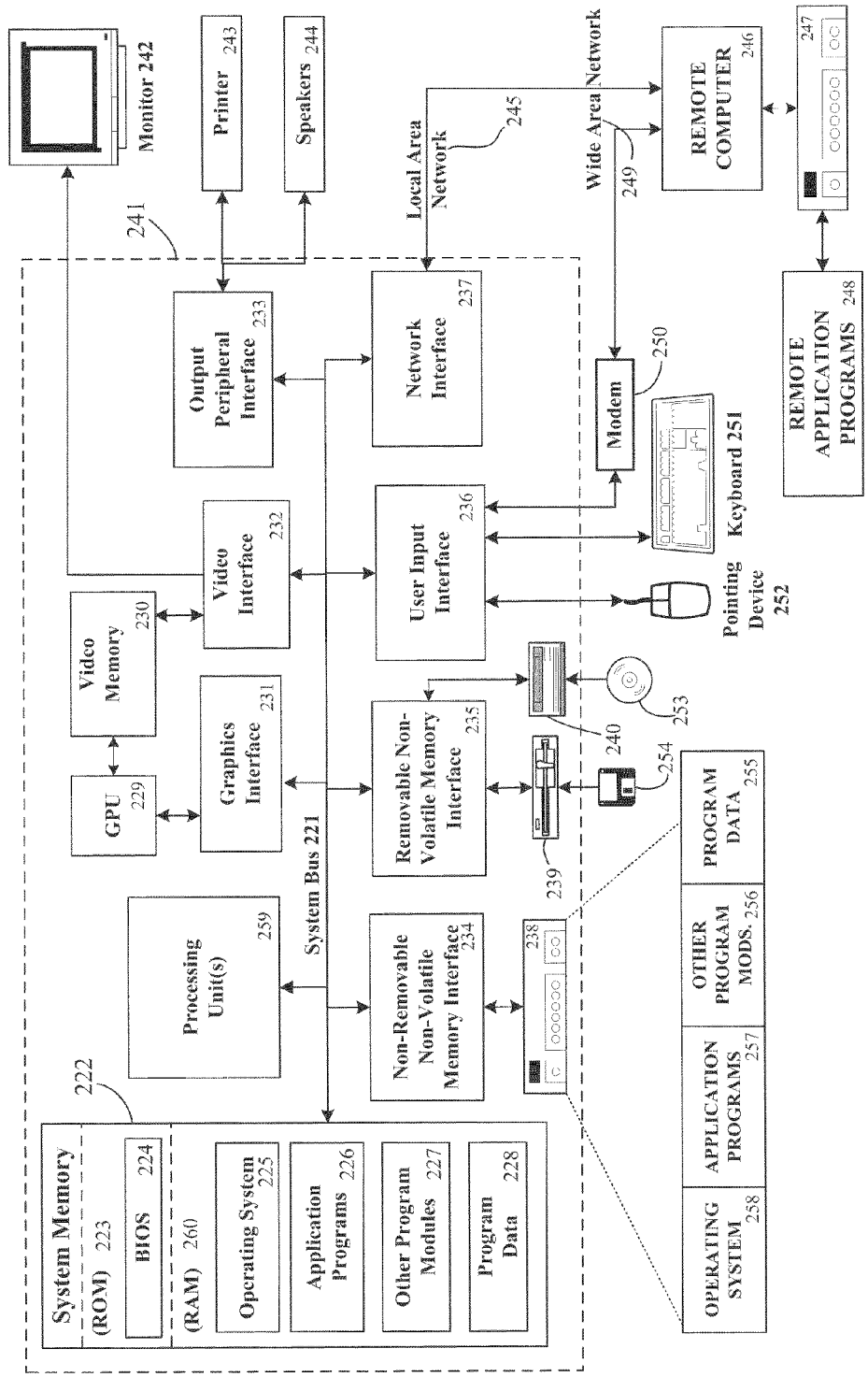
FIG. 4 illustrates another example embodiment of a computing environment in which the animation techniques described herein may be embodied.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

The computer readable storage medium may comprise computer readable instructions for modifying a visual representation. The instructions may comprise instructions for rendering the visual representation, receiving data of a scene, wherein the data includes data representative of a user's modification gesture in a physical space, and modifying the visual representation based on the user's modification gesture, wherein the modification gesture is a gesture that maps to a control for modifying a characteristic of the visual representation.

Figure 5A:
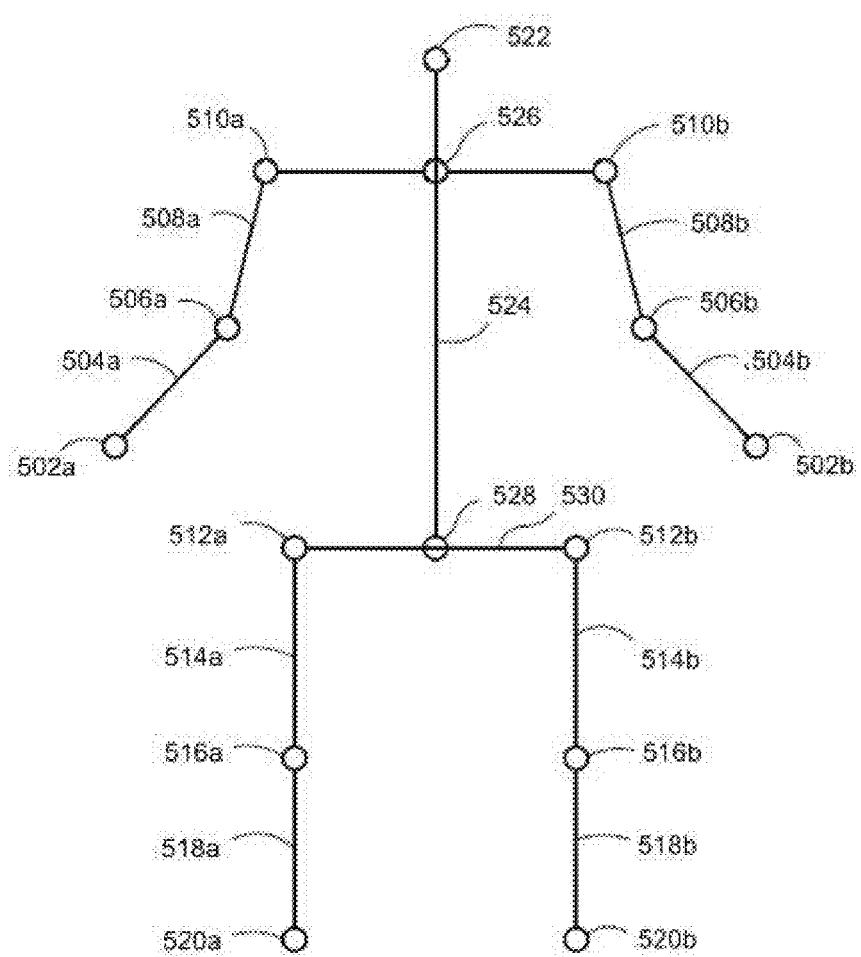
FIG. 5A illustrates a skeletal mapping of a user that has been generated from a depth image.

FIG. 5A depicts an example skeletal mapping of a user that may be generated from image data captured by the capture device 20. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and braking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of)90° exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-310*a*. It may not be necessary to define all bounds of a volume, such as with this throwing gesture, where an outer bound away from the body is left undefined, and the volume extends out indefinitely, or to the edge of scene that is being monitored.

Figure 5B:
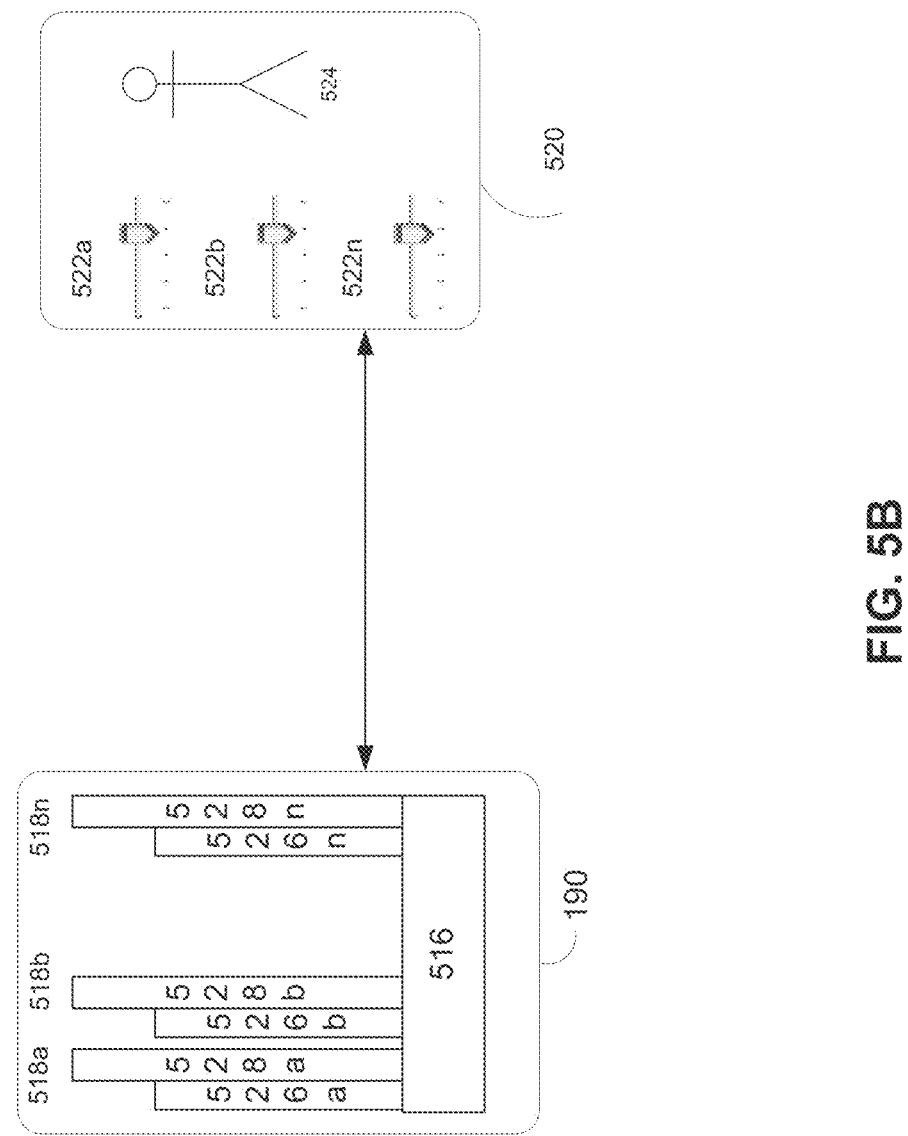
FIG. 5B illustrates further details of the gesture recognizer architecture shown in FIG. 2.

FIG. 5B provides further details of one exemplary embodiment of the gesture recognizer engine 192 of FIG. 2. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 192 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

Figure 6A:
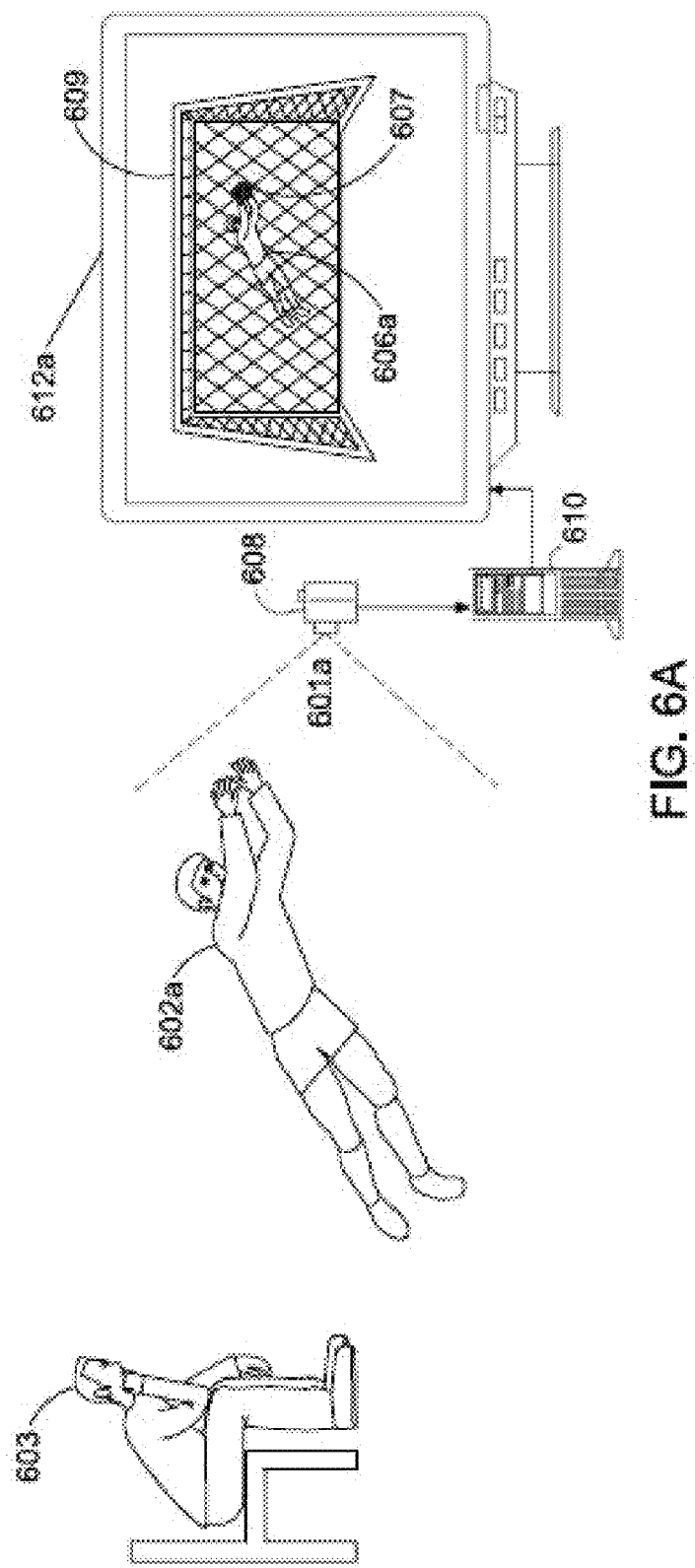
FIGS. 6A and 6B depict an example target recognition, analysis, and tracking system and example embodiments for displaying a user's avatar based on a history of inputs by that user.
Figure 6B:
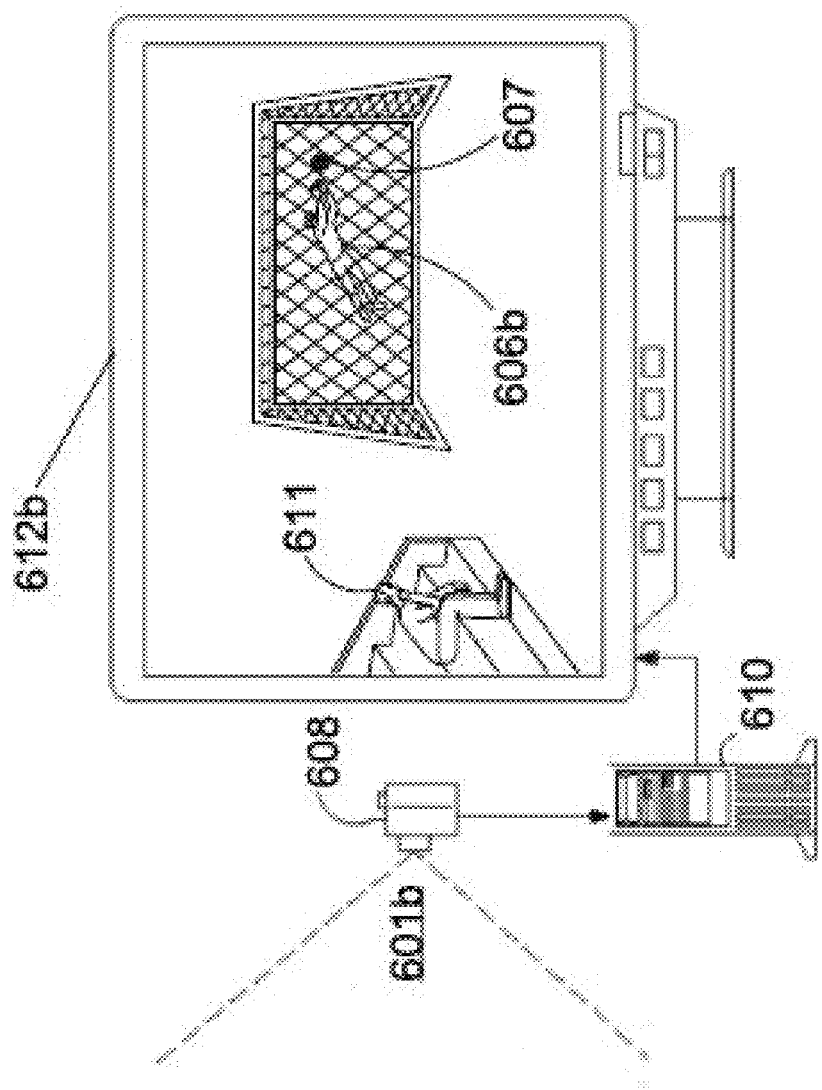

FIGS. 6A and 6B depict a system 600 that may comprise a capture device 608, a computing device 610, and a display device 612. In this example, a depth camera 608 captures a scene in a physical space 601 in which a user 602 is present. For purposes of this description, display device 612 is shown as display device 612a in FIG. 6A and as display device 612b in FIG. 6B, and user 602 is shown as user 602a in FIG. 6A and as user 602b in FIG. 6B. The depth camera 608 processes the depth information and/or provides the depth information to a computer, such as computer 610. The depth information can be interpreted for display of a visual representation of the user 602. For example, the depth camera 608 or, as shown, a computing device 610 to which it is coupled, may output to a display 612a, 612b. In this example, the user 602 is playing a soccer game application.

The capture device 608, computing device 610, and display device 612a, 612b may each comprise any suitable device that performs the desired functionality, such as the devices described with respect to FIGS. 1-5B. It is contemplated that a single device may perform all of the functions in system 600, or any combination of suitable devices may perform the desired functions. For example, the computing device 610 may provide the functionality described with respect to the computing environment 12 shown in FIG. 2 or the computer in FIG. 3. As shown in FIG. 2, the computing environment 12 may include the display device and a processor. The computing device 610 may also comprise its own camera component or may be coupled to a device having a camera component, such as capture device 608.

The visual representation of a user 602 can take any form, such as an animation, a character, an avatar, or the like. For example, the visual representation of the target, such as a user 602, may initially be a digital lump of clay that the user 602 can sculpt into desired shapes and sizes, or a character representation selected from a stock library of avatars. In a baseball game application, for example, the options for visually representing the user 602 may take any form, from a representation of a well-known baseball player to a piece of taffy or an elephant to a fanciful character or symbol, such as a cursor or hand symbol. The visual representation may represent a combination of the user's 602 features and features of an animation or stock model. For example, the user 602 may select from a variety of stock models that are provided by a game application. The system may apply features of the user to the selected stock model. The visual representation may be specific to an application, such as packaged with a program, or the visual representation may be available across-applications or available system-wide.

The example visual representation shown in FIGS. 6A and 6B, as shown on the display device 612a, is that of an avatar 606 with features that resemble those of the user 602. FIGS. 6A and 6B show the avatar 606 in two different frames or points in time, represented by avatar 606a in FIG. 6A and as avatar 606b in FIG. 6B. Though additional frames of image data may be captured and displayed, the frames depicted in FIGS. 6A and 6B are selected for exemplary purposes. The rate that frames of image data are captured and displayed may determine the level of continuity of the displayed motion of the visual representation.

The system 600 may capture information about the physical space 601, such as depth information, image information, RGB data, etc. According to one embodiment, image data may include a depth image or an image from a depth camera 608 and/or RGB camera, or an image on any other detector. For example, camera 608 may process the image data and use it to determine the shape, colors, and size of a target. Each target or object that matches the human pattern may be scanned to generate a model such as a skeletal model, a flood model, a mesh human model, or the like associated therewith. For example, as described above, the depth information may be used to generate a skeletal model of the user, such as that shown in FIG. 5A, where the system identifies the user's body parts such as the head and limbs. Using, for example, the depth values in a plurality of observed pixels that are associated with a human target and the extent of one or more aspects of the human target such as the height, the width of the head, or the width of the shoulders, or the like, the size of the human target may be determined.

The system 600 can track the movements of the user's limbs by analyzing the captured data and translating it to the skeletal model. The system 600 can then track the skeletal model and map the movement of each body part to a respective portion of the visual representation. For example, if the user 602 waves his or her arm, the system may capture this motion and apply it to the avatar's 606 arm such that the virtual avatar also waves its arm. Further, the system 600 may identify a gesture from the user's motion, by evaluating the user's position in a single frame of capture data or over a series of frames, and apply the gesture to the visual representation.

The system can use captured data, such as scanned data, image data or depth information to identify characteristics indicative of the user's behaviors to learn the user's behaviors. For example, a system may have a capture device that captures data about the user in the physical space. The system may identify a user's behaviors by collecting and storing a history of data regarding characteristics indicative of the user's behaviors, such as the user's physical features, tendencies, voice patterns, habits, vocabulary, voice commands, voice fluctuations, responses, behaviors, gestures, etc, and identify circumstances that may elicit certain user behaviors, such as the contextual circumstances. The system may record or store a history of data about the contextual circumstances associated with the user's behaviors, such as the system status, game or application status, or any other features of the scenario. Further, the system can evaluate the scenario and draw correlations between the contextual circumstances and the user's behavior to determine the user's tendencies in different scenarios. For example, the system may learn how the user's voice fluctuates under certain circumstances, or how the user stands when the user is not an active participant in the executing application.

It may be desirable to animate the user's avatar even if actual user is not present. For example, when the user is not in the physical space, it may be desirable to provide an avatar that represents the user and is able to behave in accordance with the user's behaviors (as learned by the system). Thus, the system may access the history data and apply animations to the avatar that are indicative of the absent user's behaviors and tendencies, even if the user is not present in the physical space. For example, the system can apply animations to the absent user's avatar such that the absent user's avatar moves, talks, uses language, etc, that correspond to the absent user. This allows a second user to have a virtual experience with the absent user's avatar that would be similar to the instance where the absent user is present and interacting with the system.

Over time, the system 600 may continue to learn a user's tendencies and continuously update the user's avatar library with characteristics indicative of a user's behaviors and tendencies and with contextual circumstances. The contextual circumstances may be correlated to certain user behaviors, where the user may respond to certain contextual circumstances in identifiable ways. The system may intelligently apply animations to the user's avatar 606 such that the avatar 606 behaves and responds in accordance with the behaviors of the user. As the system gathers more data from the user's inputs, the avatar may become a closer and closer reflection of the user, having aspects of the user's physical features, behaviors, emotions, speech patterns, tendencies, voice patterns, etc. Thus, training an avatar the animations to perform may comprise learning the inputs from a user and molding the avatar to resemble the user. The user may not be present in the physical space but the user's avatar may become such a close resemblance to the user that it appears that the user is present and/or controlling the avatar.

The identity of characteristics indicative of a user's behaviors may include information that may be associated with the particular user 602 such as behavioral tendencies, speech patterns, facial expressions, skeletal movements, words spoken, history data, voice recognition information, or the like. The user's characteristics may comprise physical features of the user, such as: eye size, type, and color; hair length, type, and color; skin color; clothing and clothing colors. For example, colors may be identified based on a corresponding RGB image. Other target characteristics for a human target may include, for example, height and/or arm length and may be obtained based on, for example, a body scan, a skeletal model, the extent of a user 602 on a pixel area or any other suitable process or data. The computing system 610 may use body recognition techniques to interpret the image data and may size and shape the visual representation of the user 602 according to the size, shape and depth of the user's 602 appendages.

The system may actively or passively learn the user's behaviors. In FIG. 6, the avatar 606 is a close physical representation of the user 602, with added features and animations that are applicable to the soccer game application (e.g., the goal post and net 609, the ball 607, etc). The user 602 is the active player in the soccer game application and a second user 603 is the non-active player, although both are in the physical space. As used herein, non-active merely refers to the user 603 that is not, in this example, presently performing gestures to control aspects of the application. More than one user may be active at one time. Alternately, the system may allow one active user at a time. In this example, the non-active player 603 is waiting for his or her turn, while the current player 602a is gesturing to control the avatar 606a on the display 612a.

Active user learning is learning associated with gestures or controls of the application, and may comprise learning behaviors from either or both users 602a, 603. Active user learning describes when a user, such as user 602 or user 603, performs specific motions or gestures, and the system identifies characteristics indicative of the user's behaviors associated with the user's gesture. Gestures may include dynamic or static movement as well as voice commands, and may be performed to control aspects of the system or an executing application. For example, in FIG. 6A, the user's 602a motion in the physical space 601 comprises a diving motion to the left with the arms stretched out to the left. The gesture may be recognized as a soccer goalie move and can result in controlling the animation of the avatar 606a. The result of the gesture may be recognized as a failure or success in the game (e.g., the gesture may result in a failure/success in the soccer game application). The system 600 may identify aspects of the gesture itself or behaviors that correspond to the gesture and associate those aspects or behaviors with the user.

FIG. 6 depicts an example scenario in which the system can actively learn a user's behaviors associated with a gesture, where the user is performing gestures in a soccer game application. The system 600 may identify aspects of the gesture itself or behaviors that correspond to the gesture and associate those aspects or behaviors with the user. In this manner, the gesture data and behaviors of the user that correspond to the gesture may be applied to an avatar such that the animations are tailored to the specific user. In this example, the user 602 is playing the role of a soccer goalie. If the majority of the time that the user 602 performs a goalie gesture that results in saving a ball 607 from going into the net 609 the user also does a dance, the system may identify and correlate the user's behaviors (e.g., the dance) with the contextual circumstances (e.g., soccer goalie gesture and the successful result of the gesture). Thus, the system can correlate a user's behaviors with the state of the game. In another example, if the user tends to open his mouth when gesturing to hit a tennis ball in a tennis game application, or the user grunts during a serving gesture in the tennis game application, the system may include information in the gesture data that indicates other behaviors of the user that occur when performing the gesture.

The system can store animation that corresponds to the user's behavior, such as an animation of the user's dance. The system may store an indication in the user's profile that the animation correlates to certain contextual circumstances, such as the performance of the gesture and/or state of the game. Similarly, the system can identify tendencies in a user's facial expressions, body positions, language, etc, that correlate to the user's gesture, a state of the application, or any other identifiable contextual circumstance (including an idle state), and indicate the correlation in the user's profile or the avatar library, for example. In the future, when the user performs the gesture and it results in a similar state of the game (e.g., the success of saving the ball from going into the net), the system may apply the dancing animation to the user's avatar. Similarly, if the user is not present, the system may render the user's avatar and simulate the user's participation via the avatar, such as applying gestures and animations associated with those gestures to the avatar. In this example, the system may identify history data and also apply the dancing animation to the user's avatar under the appropriate contextual circumstances. Thus, the user's avatar may represent a close resemblance to the user based on history data, even if the system is not using data captured with respect to the user in real time.

The system can passively learn a user's behaviors when the user is not active, such as when the user is acting naturally in the physical space where the user's behavior may not correspond to a gesture. The system can passively detect the user's behaviors under such circumstances such as the user's tendencies, responses, idle activity, etc. During passive learning, the system may capture data of the user when the user is acting naturally. For example, during passive learning, the user may not be interacting with the system, or it may be another player's turn in a game application. Passive player training may include the system's learning how the player behaves (e.g., body position, facial expressions, actions, words spoken, voice fluctuations), when the user is idle throughout an experience. For example, in FIG. 6, the second user 603 in the physical space 601 is not actively interacting with the soccer game application being played by the first user 602. The second user 603, while idle, is seated and the user's 603 head is resting in the user's 603 hand. The system may learn the user's habits in such scenarios and add them to the avatar library of the user.

The system can learn any of the user's natural or idle behaviors in such circumstances and associate them to the user. For example, the system may identify how the player walks and save the motion as the walking animation in the avatar library for that user. The system can watch and listen to a user during activity under various circumstances and scenarios that may not involve a gesture or other active control of the system or the executing application. For example, when a user greets a friend in a remote game playing experience, the system may detect that the user typically greets friends with a typically greeting such as "Hi, buddy, how are you?" The same user may greet unknown players with a greeting such as "Hello, my name is . . . " The system may use the captured data, including the voice fluctuations, words spoken, and any other motion, and add it to the avatar library for the user's avatar.

The avatar library may comprise pre-packaged animations that may be applied to an avatar to represent the user's gesture or any other user behavior. Through passive learning, the system may update, add, or rewrite animations in the avatar library. The system or user may modify aspects of the animation entirely, add, update, reprogram, rewrite, or delete entries in the avatar library. For example, a user may not be interacting with the system or gesturing for any control of the application. The user may be idle while another user is active in the application. The system may apply a standard animation to the user's avatar that represents idle behavior, such as animating the idle user's avatar to sit quietly and observe the active user perform in the physical space. However, the system may capture data related to the actual behavior of the idle user when the user is idle in the game application. The system may record the user's behavior and add them to an entry in the avatar library for an idle animation for that user. The system may rewrite the standard animation for idle behavior with an animation that represents the user's behavior as recorded by the system.

For example, the system may recognize that when user 603, shown in FIG. 6A, is idle or non-active, the user 603 tends to place the user's head in the user's right hand. The system may store data related to this in a profile or avatar library associated with the user. The animation may represent an addition to the avatar library or it may be a rewrite of a default animation for idle activity. Thereafter, the system may apply an animation to that effect to the avatar 611, such as the animation of avatar 611 shown in FIG. 6B, where the avatar is seated with the avatar's head in the avatar's right hand. However, over time, the system may recognize that the user 603 more often rests his or her head in the user's left hand, or tends to switch between hands often while idle. Thus, the system may continue to refine the avatar library and the animations in the avatar library to more closely represent the identified tendencies of the user. The system may also keep the original animation data and add the redefined animation to the user's avatar library, providing multiple animations for selection.

FIG. 6B depicts the system 600 shown in FIG. 6A. FIG. 6B depicts an example of just the user 602 in the physical space 601. In this example, the same user 602 is gesturing in the physical space 601, resulting in an animation of the user's avatar 606b that is representative of a goalie gesture similar to that applied to the avatar 606a in FIG. 6A. However, in this example, the motion of the user 602 in the physical space is varied from that performed by the user 602 in FIG. 6A, but the same gesture is identified and represented by both avatars 606a and 606b.

Packages of standard gestures are gestures from which system and application developers can incorporate gesture recognition into their systems and/or applications. The system may modify aspects of the gesture or rewrite the gesture entirely. For example, the system may modify a motion that corresponds to a particular gesture by redefining the motion. For example, user 602b may be injured and unable to dive in the physical space 601 as previously performed by the user 602a, shown in FIG. 6A. The system may recognize the user's varied motion or the user may request to modify the gesture data. For example, the system may prompt a user with a basic canned gesture or voice command as a demonstration and the user can perform the user's own version of that gesture or voice command. To redefine the gesture, the user 602 may perform the motion shown in FIG. 6B that comprises a standing position, leaning to the left, and swinging the arms out to that side. The system can temporarily or permanently overwrite the default gesture data with the user-defined gesture data. The system may also keep the original gesture data and add the redefined gesture to the user's avatar library, providing multiple gestures that provide a similar result in the application. Following the redefinition or addition of the gesture, the system may capture data with respect to the user in the physical space and be able to determine from that data whether the user has performed the redefined or added gesture.

Similarly, active user learning may comprise identifying a user's gesture where the gesture itself is a prompt to modify an animation in the avatar library and/or modify the behaviors identified by the system and associated with the user. For example, the user may initiate a modification to an animation or initiate the addition of an animation to the avatar library by performing a gesture or entering into a modification mode of a pre-packaged animation. The system may prompt a user with a basic canned animation or voice data as a demonstration, and the user can perform the user's own version of that animation or provide speech samples.

For example, the system may apply an animation to the avatar 611 associated with user 603 that comprises a seated position with the avatar's head resting in the avatar's hand, similar to that shown in FIG. 6B. The system may recognize that when the user is idle or when the user performs a similar motion in the physical space, the user tends to position himself or herself as shown in FIG. 6A. However, the user may wish to modify the history data that indicates this behavior for the user when the user is idle. The user may perform a gesture to initiate a modification of the history data and/or the animation applied to the user's avatar under particular contextual circumstances (e.g., idle activity). The system may prompt a user with the current animation associated with particular contextual circumstances, and the user can perform a different version of that animation for rewriting the animation in the avatar library.

In both scenarios that the system or user adds, updates, or rewrites gesture or animation data, the system may record the user's inputs and validate the redefined gesture or animation data. For example, if the user is performing a "wave" gesture, the system can detect that the motion corresponds to the "wave" gesture via the gesture recognition engine as described above. The system may detect where the gesture starts and stops and prompt the user to perform a new motion in the physical space to overwrite the current "wave" gesture data and/or create an additional "wave" gesture that corresponds to the user's recorded motion.

The system may validate the user's recorded motion. For example, in a game application that is identified for teenagers, the system may not confirm a user's motion for a gesture if the user's proposed motion for that gesture comprises a socially unacceptable motion (e.g., a rude motion). Thus, the system may identify a user's behavior that is not desirable and that should not be reflected by the user's avatar. Consider the soccer game application where the user plays the role of the soccer goalie. The system may identify the user's tendency to swear or make obscene gestures when the user performs a goalie gesture and the result is a failure (i.e., the ball goes into the net). Thus, the system may select a different animation to apply to the avatar under these contextual circumstances, such as a user-specific animation from the user's avatar library or a generic animation from a generic avatar library. When the system identifies the goalie gesture and the state of the game (e.g., failure to save the ball), the system may be tuned to apply a non-obscene animation to the avatar rather than the avatar mimicking the motions made by the user in the physical space. Similarly, the system may invalidate the behavior and not include it as an animation in the avatar library from which to choose when applying animations to the user's avatar. Thus, some behaviors or indications of such behaviors may not be stored for later use.

FIG. 6B depicts an example where the system may apply the user's behaviors and tendencies to the avatar, whether or not the user is actually in the physical space. In FIG. 6B, the avatar 611 represents the user 603 from FIG. 6A. However, user 603 is no longer in the physical space 601 in FIG. 6B. It may be desirable, when the user is not in the physical space, to provide an avatar that represents the user and is able to behave in accordance with the user's behaviors (as learned by the system). For example, the system may continue to display the user's avatar and apply animations to the user's avatar that correspond to the user's tendencies and behaviors, even if the user leaves the room and is no longer within tracking view of the system. Consider a game application, where a first user selects to play a game against a second user, but that second user may or may not be in the physical space. The system can mimic the second user, reflecting the user's physical characteristics, tendencies, behaviors, and other characteristics, based on a profile of that second user. The second user's abilities can be mimicked, for example, if a skill level is applicable to the application. Thus, the first user can have an experience with the second user's avatar that would be similar to the instance when the second user is actually in the physical space and/or interacting with the system. The system can apply animations to the second user's avatar such that the second user's avatar moves, talks, uses language, etc, that correspond to the second user.

The behaviors of the user 603 may be identified from the user's prior inputs and/or the data captured by the system, over time, with respect to the user 603. The avatar increasingly reflects aspects of the user in the physical space, including aspects related to the user's features, behaviors, tendencies, voice patterns, etc. For example, the system may learn a user's tendencies and intelligently apply animations to the user's avatar such that the avatar behaves and responds in accordance with the identified tendencies of the user. Thus, training an avatar the animations to perform may comprise learning from the history of inputs from a user and molding the avatar to resemble the user.

The system may learn how the user responds to various scenarios and capture the status of the user's characteristics. For example, if a user is standing idle during a game application, where another user is the active player, the system may detect the user's body position and activities that the user may partake while not the active player. The user may take a drink, stand idle against the wall, watch the active player or the screen, read a book, or any other activity. For example, it may be common for the user to read a book while not the active player. The system may recognize this tendency and store information related to the tendency in a user's profile.

In FIG. 6A the system may have detected the user's 603 body language, positioning, language spoken, etc, while the user 603 was observing user 602 actively participate in the soccer game application. The system may have other history data with respect to user 603, captured over a period of time. In FIG. 6B, the user 603 is not in the physical space 601, however the user's avatar 611 may be displayed on the display device 612. The system may apply animations to the user's avatar 611 that correspond to the history data gathered for the user's 603 behaviors. Thus, the system may depict the user's avatar 611 in a seated position similar to how the user typically behaves when the non-active player in the game. The system may provide additional animations, such as placing the user in seats or bleachers that might be found at a typical soccer game and may be where typical observers of a soccer game sit.

The system may store data related to the user's inputs in an avatar library, such as avatar library 196 shown in FIG. 2. The avatar library may be associated to a particular user or stored in a user profile, such as profile 198, for example. As described above, the system allows users to overwrite or add to the stock library of animations. In another example embodiment, the animations in the library may be animations entered and recorded by the user into the avatar's library. For example, the system or the user may reprogram an animation to reflect the user's actual motions or behaviors, captured by a capture device for example. Thus, animations may be added to or overwritten in the library of avatar animations.

The system may also comprise a universal or generic avatar library that comprises a stock library of animations. In an example embodiment, the animations applied to the avatar may be animations selected from a library of pre-packaged animations, such as those that come with a program, application, or a system, for example. The animations selected may be those which correspond to the user's inputs learned by the system to reflect certain behaviors. The pre-canned animations may be defined for an application or for a system. For example, an open/close file animation applied to an avatar may be the same system-wide.

The avatar libraries, including an avatar library that corresponds to a user, may be accessible for an application, across applications, or system-wide. For example, the system may identify the user's behaviors throughout various applications. The system may collect all of the data related to the user's behaviors across applications and store them in a universally-acceptable avatar library. The system may then access the avatar library and apply animations from the avatar library to the avatar under any circumstance. For example, the system may identify that the user typically bites his or her nails when the user is not the active player in a game. Thus, when the user is interacting with the system during the execution of a non-game application, the system may apply an animation of nail-biting to the user's avatar when there are delays in user interaction with the application, such as when the user is waiting for a document to save or for a debugger to run on software.

The system may display a user's avatar at any time and at any time apply animations to the avatar that reflect the user's behavior. Over time, the system may apply animations of the user any type of scenario with or without assistance from the user. For example, using the avatar library and stored data associated with a user's behaviors, the system can generate a voice mail message using the user's identified voice patterns and volumes without input from the user. The system could mimic the user's behaviors when applying animations to an avatar in an application's dashboard, in communication with friends, in game applications, or the like. The user may or may not be controlling the avatar—rather, the system may be providing the likeness of the user's avatar. The system may apply animations to an avatar associated with a particular user, whether or not the particular user is present in the physical space. For example, the user could be writing a document in a word processing application and the system could display and animate an avatar on the screen that resembles the user. The system could apply animations from the user's avatar library.

The system may identify that the user behaves differently between applications or across different environments. For example, in a game application, the user may watch and observe the display and/or the other user when the other user is the active player in the game. However, in a non-game application, the user may not observe the screen when another user is active or if the application is saving a document or running a debugger, for example. The user may bite his or her nails or leave the room.

The avatar may be displayed, even if the avatar is not necessary to the application for controlling any aspect of the application or the system. An avatar may be displayed, performing and behaving as learned from the user's inputs, typically learned by the system following a series of inputs that are sufficient to identify behaviors, responses, tendencies, or the like. For example, a first user may be telling a story in the physical space and select an avatar to be displayed on screen to animate the story as it is being told. The avatar selected may be an avatar associated with a user that is not present in the physical space. However, the system may have enough information stored with respect to the user that is not present to animate the avatar such that it appears to behave like the user that is not present. The system could use the avatar that comes with an avatar library full of animations that correspond to the user's behaviors that the system has learned over time. Thus, it could appear that the user is present and providing inputs because the avatar is able to represent the user so well.

As described, the system 600 may identify data from the physical space that are indicative of the user's behaviors. For example, the system 600 may gather information related to the user's motions, facial expressions, body language, emotions, etc, in the physical space. The system may use body posture recognition techniques to assist in the identity of the emotions or temperament of the human target. For example, the system 600 may analyze and track a skeletal model of the user to determine how the user moves. The system 600 may track the user's body and the motions made by the user's body, including gestures that control aspects of the system, such as the application, operating system, or the like. The system may identify the user's body posture, facial expressions, vocal expressions and tone, directed gazes, etc. The user's vocal expressions may provide an indication of the user's temperament. For example, the language used, the tone of voice, the pitch, volume, and the like may convey a sense of the user's temperament. For example, a harsh tone may be interpreted as anger or aggression. Other tones may be tense, modal, breathy, whispery, creaky, calm, excited, happy, or any other tone. The system may identify the user's facial movements, such as the movement of the user's eyebrows and/or a frowning or smiling expression. The system may detect words said by the user and the user's tone of voice, or the user's body position, etc. For example, the system may detect the right arm of a person and have the fidelity to distinguish the upper arm, lower arm, fingers, the thumb, joints in the fingers, etc. Thus, the user's characteristics are good indicators of the user's behaviors and tendencies.

In the example shown in FIG. 6A, the user 603 is sitting with a head tilted to the side, a right elbow resting on the knee, and the head being supported by the user's right hand. The user's facial expressions, body position, words spoken, or any other detectable characteristic may be applied to the user's avatar 611, and modified if appropriate. For example, the user 603 is seated in a chair, but the system modifies the user to be seated in bleachers or seats that might be found at a soccer game.

The system 600 may compare the circumstances of the application with a user's avatar library to determine what animations should be applied to the user's visual representation. For example, in the soccer game application described above, the state of the game may be the user's success in saving a ball. The system may apply the animation of the user's dance to the avatar as the system has identified this behavior as typical for this user under these circumstances. In another example, where a first user is present in the physical space and telling a story with the avatar for a second user selected for acting out the story on the display. The second user may or may not be present, but the avatar may act out the story on the display, reflecting the behaviors identified for the second user. For example, the story may describe a person jumping over a creek. The avatar, that resembles the second user, may be shown jumping over a creek, but animated to appear like the second user, reflecting the behavior's of the second user. For example, the system may identify behaviors of the user that are typical when a user is jumping, or when a user is scared, or having fun. The system may apply animations to the avatar that correspond to the circumstance and the data stored about the user's behaviors in such circumstances.

FIG. 7A depicts an example of two users remotely playing against each other in a boxing game application. The remote users interact with a target recognition, analysis, and tracking system 10 in their respective physical space, and are able to interact with each other over a network connection. Each system can provides live visual feedback of each physical space to the other system. In FIG. 7A, two users, User #1 and User #2, are interacting with the system executing the boxing game application. Thus, each system may capture live data with respect to each user and render the visual representation that corresponds to each user and maps to the motion of each user. In FIG. 7B, the second user is no longer present in the physical space and is absent from the tracking view of the target recognition, analysis, and tracking system. However, the system has collected data with respect to the user's behaviors, either in this instance of the boxing game application, prior instances, or in any other interaction by the user with the system or an application. The system is able to apply animations from an avatar library associated with the user that reflect the user's behaviors. Thus, based on the history of the user's inputs, the system is able to render a visual representation that appears very similar to the user. User #1 can have an experience with the second user's avatar that would be similar to the instance where actual user data were applied to the avatar.

Figure 8:
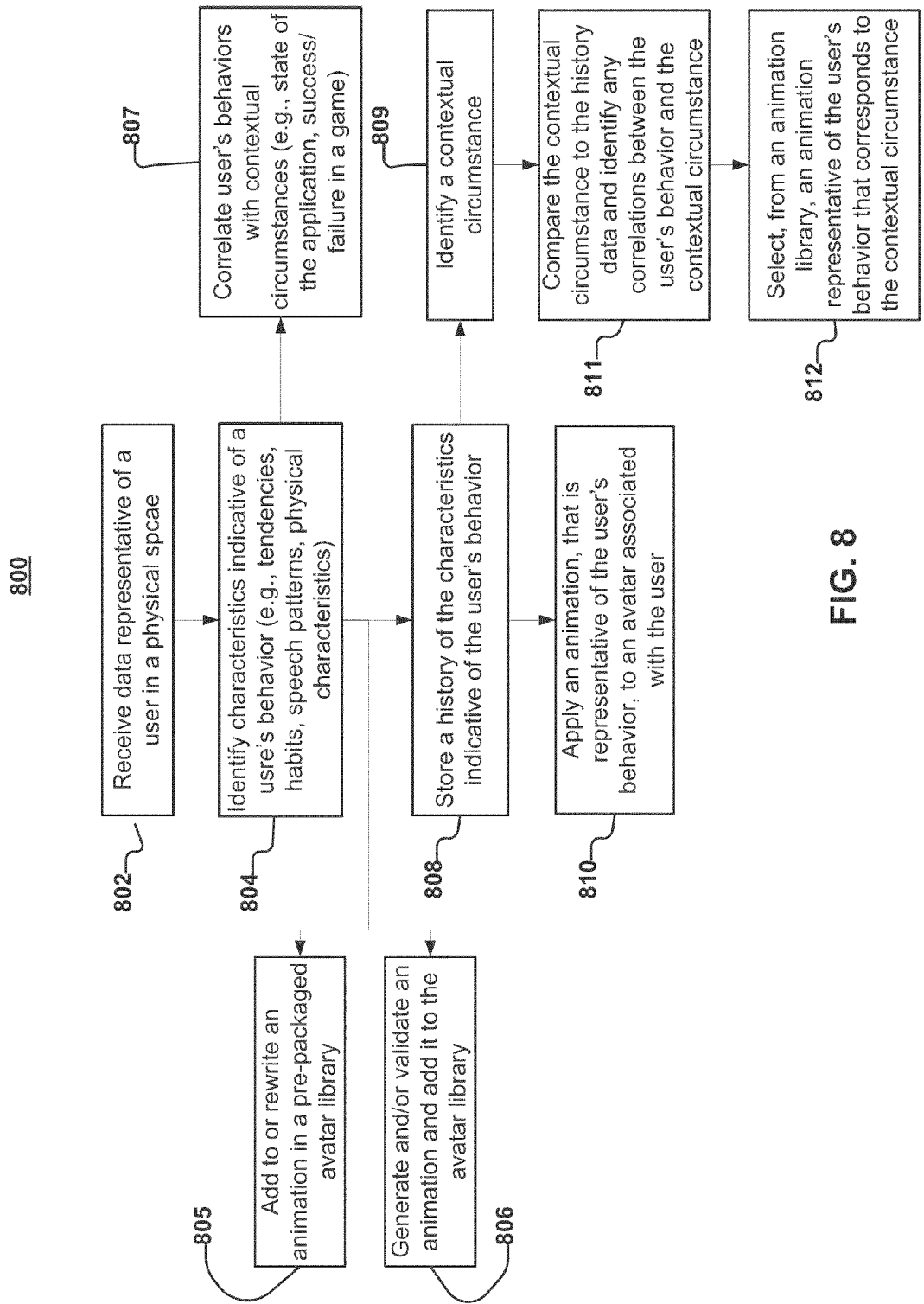
FIG. 8 depicts an example flow diagram for a method of collecting behavioral data with respect to a user's inputs.
Figure 9:
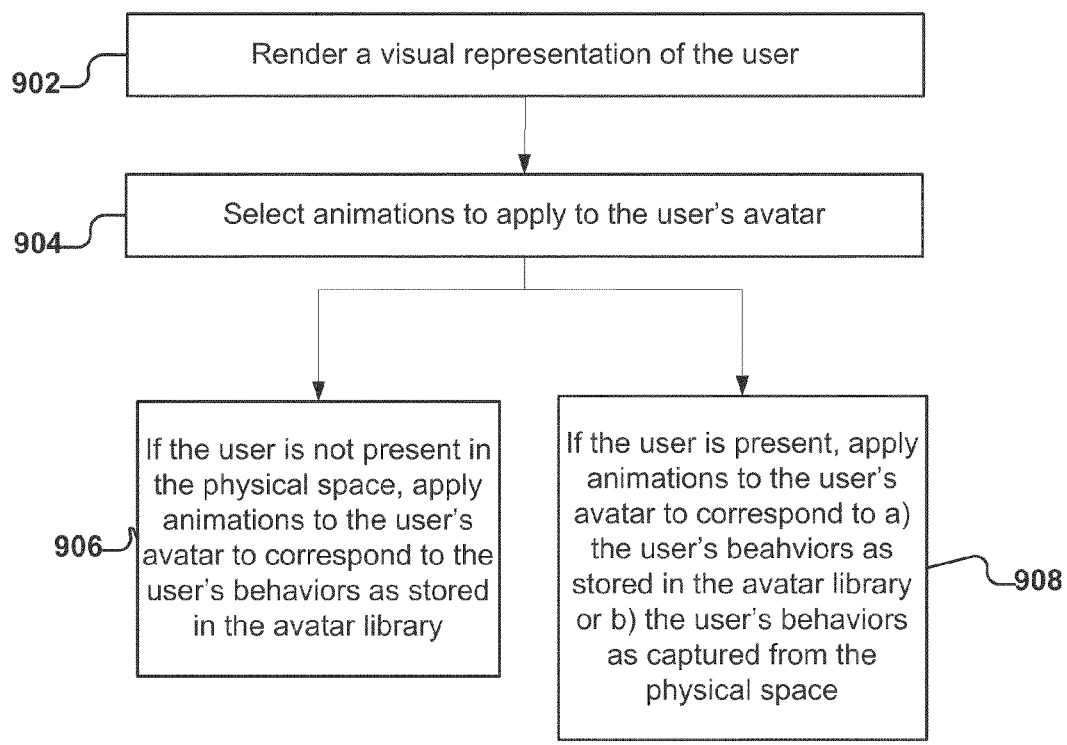
FIG. 9 depicts an example flow diagram for a method of intelligently applying animations to a user's avatar.

FIG. 8 shows an example method of learning a user's behaviors and FIG. 9 shows an example method of applying animations of select behaviors to the user's avatar. For example, at 802, the system receives data from a physical space that includes a user. As described above, a capture device can capture data of a scene, such as the depth image of the scene and scan targets in the scene. The capture device may determine whether one or more targets in the scene correspond to a human target such as a user. Each target or object that matches the human body model may then be scanned to generate a skeletal model associated therewith. The skeletal model may then be provided to the computing environment for tracking the skeletal model and rendering a visual representation associated with the skeletal model.

At 804, the system may identify characteristics indicative of the user's behaviors. The characteristics indicative of the user's behavior may comprise physical characteristics, facial features, speech patterns, vocabulary, voice commands, a gesture, motion, or body position. For example, the system may use body recognition and facial recognition techniques to identify body and facial characteristics. The user's behaviors, that may include certain facial expressions and body movements, may be identified. For example, a system may have a capture device that captures data about the user in the physical space. The system may identify the user's characteristics, tendencies, voice patterns, behaviors, gestures, etc. The system may identify characteristics indicative of a user's behavior passively and/or actively. For example, passive learning may comprise identifying the user's characteristics when the user is acting naturally in the physical space, and active learning may comprise identifying the user's characteristics when the user is performing a gesture. Over time, the system may learn a user's tendencies and intelligently apply animations to the user's avatar such that the avatar behaves and responds in accordance with the identified tendencies of the user. Thus, training an avatar the animations to perform may comprise learning the inputs from a user and molding the avatar to resemble the user.

At 805, the system may add or rewrite an animation in a pre-packaged avatar library. For example, the pre-packaged avatar library may be a default set of animations provided with an application. Rewriting an animation in the pre-packaged avatar library may comprise updating the animation to correspond to a history of the characteristics indicative of the user's behavior, as stored at 808. Adding an animation to the pre-packaged avatar library may comprise recording a user's motion in the physical space and adding an animation representative of the user's motion to the avatar library. The adding to or rewriting an animation in the avatar library may be prompted by a user's gesture. For example, the user may perform a gesture to enter into a modification mode, and the system can record the user's motions in the modification mode and apply them to the added or rewritten animation.

At 806, the system may generate an animation and add it to an avatar library. The avatar library may or may not be pre-packaged. For example, the avatar library may comprise animations recorded by the user and may or may not be provided by the system. Thus, the user may define all the animations in the avatar library that are applied to the user's avatar. The system may have to validate any animations added to, rewritten, or generated. For example, if the user performs an animation that is obscene, the animation may be invalidated and not entered into the history data or not used to rewrite an animation. Alternately, the avatar library may be a combination of animations recorded by the user and/or pre-packaged animations.

At 807, the system may correlate the user's behaviors with particular circumstances. For example, a user may behave in a certain manner when the user achieves success in a game application or when the user is idle in an experience while watching an active user play the game. Data related to the user's behaviors, including the correlation of the user's behaviors with any particular circumstances, may be stored such as in an avatar library at 806. As described above, the avatar library may comprise pre-packaged animations or the avatar library may be associated with a particular user having animations tailored to that user. User specific information may also include tendencies in modes of play by one or more users. For example, if a user tends to behave or react in a certain manner, the system may track the user's tendencies to more accurately reflect the user's behaviors under certain circumstances. Thus, the system can begin to track the user's tendencies and use that information to more accurately reflect the user's behaviors.

At 806, the behaviors and animations corresponding to those behaviors, associated with a user in the physical space, may be stored as part of a user profile. The profile may be specific to a particular physical space or a user, for example, and may be part of or include aspects of the avatar library. Avatar data, including features of the user, may become part of the user's profile. A profile may be accessed upon entry of a user into a capture scene. If a profile matches a user based on a password, selection by the user, body size, voice recognition or the like, then the profile may be used in the determination of the user's visual representation.

History data for a user may be monitored, storing information to the user's profile. For example, the system may detect behavioral features specific to the user, such as the user's behaviors, speech patterns, emotions, sounds, or the like. The system may apply those features to the user's visual representation when applying a temperament to the visual representation. For example, if the system identifies the user's behaviors and selects an animation to comprising speech to reflect the behavior, the visual representation's voice may be patterned from the user's speech patterns or may even be a recording of the user's own voice.

The system may render an avatar associated with the user and, at 810, apply an animation that is representative of the user's behaviors to the user's avatar. At 808, the system may identify contextual circumstances. Contextual circumstance may comprise the condition of a user's physical environment, the condition of a user's virtual environment, a status of a system, a status of an application, a success of the user in an application, a failure of the user in an application, an active/non-active status of the user, a presence of a second user, or a gesture, or the like. By comparing the contextual circumstances to the history data, the system may identify any correlations between the history data and contextual circumstance. If a correlation is identified, the system may select an animation representative of the user's behavior that corresponds to the contextual circumstance.

FIG. 9 shows a method for applying animations to a user's avatar. The animations may be applied whether or not the user is present in the physical space. Thus, the system may provide a reflection of the user, in the form of the avatar, that has the likeness of the user and behaves in accordance with the user. The user's avatar may represent the user even if the user is not interacting with the application/system, such as if the user is not present in the physical space. At 902, the system renders a visual representation of the user. Based on information stored in the avatar library, such as that described in FIG. 8, animations may be applied to the user's avatar that correspond to the user.

The system may select animations, at 904, for application to the avatar that correspond to the learned inputs of that particular user. If the user is not physically present in the physical space, such as at 906, the animations may correspond to the user's behavior learned by the system and stored in an avatar library associated with that user. Thus, the avatar can appear to behave in a similar manner to the user, even if the user is not available in the physical space for capture by the capture device. A second user can request that the system render a visual representation of the user that is not physically present to simulate an experience with the first user.

If the user is present, such as at 908, the animations may be selected from the avatar library or mapped directly to the user in the physical space as captured by the system. The animation may be selected from an avatar library and may be representative of a user's behavior identified from a history of user data. Thus, the animations may be selected based on the previous identity of behaviors captured by the system Even if the user is present in the physical space and data is captured by the capture device with respect to the user, it may be desirable to apply an animation from the avatar library instead of map the avatar directly to the user.

In an example embodiment, the animations applied to the avatar may be animations selected from a library of pre-packaged animations, such as those that come with a program, application, or a system, for example. The animations selected may be those which correspond to the user's inputs learned by the system. In another example embodiment, the animations in the library may be animations entered and recorded by the user into the avatar's animation vocabulary. For example, the system or the user may reprogram an animation to reflect the user's actual motions or behaviors, captured by a capture device for example. Thus, animations may be added to or overwritten in the library of avatar animations. Over time, the avatar in the virtual space may appear to become a reflection of the user in the physical space, including the user's features, behaviors, tendencies, voice patterns, etc.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for applying an animation to a visual representation of a user, the method comprising:
    selecting a first animation from a plurality of stored animations, based on a first image indicative of a user presently being in a physical capture area, the first image being received from a capture device;
    applying the first animation to a visual representation of the user on a display device;
    updating at least one animation of the plurality of stored animations based at least in part on a characteristic of the user identified based at least in part on the first image;
    in response to determining from a second image of the physical capture area that the user is not located in the physical capture area, selecting a second animation of the plurality of stored animations based at least in part on a characteristic of the user from a prior image indicative of the user in the physical capture area or another physical capture area; and
    in response to determining that a second user is interacting with a computer application in which the visual representation of the user is made, applying the second animation to a visual representation of the user on the display device to animate the visual representation of the user while the user is not located in the physical capture area whereby the visual representation of the user is animated to behave in accordance with the characteristic of the user in the second animation.

2. The method of claim 1, wherein the first animation does not correspond to data presently captured by the capture device of the user present in the physical space.

3. The method of claim 1, wherein the plurality of stored animations is a pre-packaged plurality of animations, and wherein selecting the second animation from the plurality of stored animations comprises:
    selecting the second animation from the pre-packaged plurality of animations.

4. The method of claim 1, further comprising:
    rewriting the first animation in the plurality of stored animations to correspond to the user's motion captured by a capture device, the rewriting comprising replacing a gesture in the first animation with a gesture of the user.

5. The method of claim 4, wherein rewriting the animation is prompted by a user's gesture in the physical capture area.

6. The method of claim 1, wherein the visual representation of the user is animated such that the user appears to be present in the physical capture area and/or controlling the visual representation of the user.

7. A computer-readable memory, bearing computer-readable instructions that, when executed on a computer, cause the computer to perform operations comprising:
    selecting a first animation from a plurality of stored animations, based on a first image indicative of a user presently being in a physical capture area, the first image received from a capture device;
    applying the first animation to a visual representation of the user on a display device;
    updating at least one animation of the plurality of stored animations based at least in part on a characteristic of the user identified based at least in part on the first image;
    in response to determining from a second image of the physical capture area that the user is not located in the physical capture area, selecting a second animation of the plurality of stored animations based at least in part on a characteristic of the user from a prior image indicative of the user in the physical capture area or another physical capture area; and in response to determining that a second user is interacting with a computer application in which the visual representation of the user is made, applying the second animation to a visual representation of the user on the display device to animate the visual representation of the user while the user is not located in the physical capture area whereby the visual representation of the user is animated to behave in accordance with the characteristic of the user in the second animation.

8. The computer-readable memory of claim 7, wherein the first animation does not correspond to data presently captured by the capture device of the user present in the physical space.

9. The computer-readable memory of claim 7, wherein the plurality of stored animations is a pre-packaged plurality of animations, and wherein selecting the second animation from the plurality of stored animations comprises: selecting the second animation from the pre-packaged plurality of animations.

10. The computer-readable memory of claim 7, further bearing computer-readable instructions that, when executed on the computer, cause the computer to perform operations comprising: rewriting the first animation in the plurality of stored animations to correspond to the user's motion captured by a capture device.

11. The computer-readable memory of claim 10, wherein rewriting the animation is prompted by a user's gesture in the physical capture area.

12. The computer-readable memory of claim 7, wherein the visual representation of the user is animated such that the user appears to be present in the physical capture area and/or controlling the visual representation of the user.

13. A system, comprising:

a processor; and a memory communicatively coupled to the processor when the system is operational, the memory bearing processor-executable instructions that, when executed on the processor, cause the system at least to:

select a first animation from a plurality of stored animations, based on a first image indicative of a user presently being in a physical capture area, the first image received from a capture device;

apply the first animation to a visual representation of the user on a display device;

updating at least one animation of the plurality of stored animations based at least in part on a characteristic of the user identified based at least in part on the first image;

in response to determining from a second image of the physical capture area that the user is not located in the physical capture area, select a second animation of the plurality of stored animations based at least in part on a characteristic of the user from a prior image indicative of the user in the physical capture area or another physical capture area; and in response to determining that a second user is interacting with a computer application in which the visual representation of the user is made, apply the second animation to a visual representation of the user on the display device to animate the visual representation of the user while the user is not located in the physical capture area whereby the visual representation of the user is animated to behave in accordance with the characteristic of the user in the second animation.

14. The system of claim 13, wherein the first animation does not correspond to data presently captured by the capture device of the user present in the physical space.

15. The system of claim 13, wherein the plurality of stored animations is a pre-packaged plurality of animations, and wherein the instructions that, when executed on the processor, cause the system at least to select the second animation from the plurality of stored animations further cause the system at least to:

select the second animation from the pre-packaged plurality of animations.

16. The system of claim 13, further bearing processor-executable instructions that, when executed on the processor, cause the system at least to:

rewrite the first animation in the plurality of stored animations to correspond to the user's motion captured by a capture device.

17. The system of claim 16, wherein rewriting the animation is prompted by a user's gesture in the physical capture area.

18. The system of claim 13, wherein the visual representation of the user is animated such that the user appears to be present in the physical capture area and/or controlling the visual representation of the user.

* * * * *